United States Patent
Kluth et al.

(10) Patent No.: US 10,920,686 B2
(45) Date of Patent: Feb. 16, 2021

(54) METHOD AND DEVICE FOR KNOCK CONTROL OF AN INTERNAL COMBUSTION ENGINE

(71) Applicant: Robert Bosch GmbH, Stuttgart (DE)

(72) Inventors: Carsten Kluth, Stuttgart (DE); Matthias Biehl, Krottelbach (DE)

(73) Assignee: Robert Bosch GmbH, Stuttgart (DE)

(*) Notice: Subject to any disclaimer, the term of this patent is extended or adjusted under 35 U.S.C. 154(b) by 38 days.

(21) Appl. No.: 16/221,812

(22) Filed: Dec. 17, 2018

(65) Prior Publication Data

US 2019/0195150 A1    Jun. 27, 2019

(30) Foreign Application Priority Data

Dec. 21, 2017 (DE) .................. 10 2017 223 532

(51) Int. Cl.
| | |
|---|---|
| F02D 35/02 | (2006.01) |
| G01L 23/22 | (2006.01) |
| F02P 5/152 | (2006.01) |
| F02D 41/22 | (2006.01) |
| F02D 41/28 | (2006.01) |
| F02D 41/14 | (2006.01) |

(52) U.S. Cl.
CPC .......... *F02D 35/027* (2013.01); *F02P 5/152* (2013.01); *G01L 23/225* (2013.01); *F02D 41/222* (2013.01); *F02D 2041/1413* (2013.01); *F02D 2041/286* (2013.01)

(58) Field of Classification Search
CPC ............. F02D 35/027; F02D 41/222; F02D 2041/286; F02D 2041/1413; F02P 5/152; G01L 23/225; G01L 23/221; F02B 77/085

See application file for complete search history.

(56) References Cited

U.S. PATENT DOCUMENTS

| | | | | |
|---|---|---|---|---|
| 4,899,711 A | * | 2/1990 | Tabara | F02P 5/152 |
| | | | | 123/406.38 |
| 2004/0030486 A1 | * | 2/2004 | Sauler | F02P 5/1522 |
| | | | | 701/111 |
| 2006/0243030 A1 | * | 11/2006 | Oe | G01L 23/225 |
| | | | | 73/35.09 |
| 2012/0192833 A1 | * | 8/2012 | Hagari | F02D 35/027 |
| | | | | 123/406.35 |
| 2016/0123249 A1 | * | 5/2016 | Sakayanagi | F02D 35/023 |
| | | | | 701/111 |

FOREIGN PATENT DOCUMENTS

| | | |
|---|---|---|
| DE | 3313036 A1 | 10/1984 |
| DE | 19518394 A1 | 11/1996 |
| DE | 102014224800 A1 | 6/2016 |
| DE | 102015105220 B3 | 9/2016 |
| EP | 0121790 A2 | 10/1984 |

* cited by examiner

*Primary Examiner* — Joseph J Dallo
*Assistant Examiner* — Kurt Philip Liethen
(74) *Attorney, Agent, or Firm* — Norton Rose Fulbright US LLP; Gerard Messina

(57) ABSTRACT

A method and a device for knock control of an internal combustion engine, a knock signal of a cylinder of the internal combustion engine being measured by a knock sensor and, on the basis thereof, a knock intensity is generated. The knock intensity is compared to a reference level in order to classify a combustion as a knocking or non-knocking combustion. Moreover, an arrangement is provided, which takes the level of the knock intensity into account for the determination of the reference level.

8 Claims, 1 Drawing Sheet

METHOD AND DEVICE FOR KNOCK CONTROL OF AN INTERNAL COMBUSTION ENGINE

CROSS REFERENCE

The present application claims the benefit under 35 U.S.C. § 119 of German Patent Application No. DE 102017223532.2 filed on Dec. 21, 2017, which is expressly incorporated herein by reference in its entirety.

FIELD

The present invention is directed to a method and a device for knock control of an internal combustion engine.

BACKGROUND INFORMATION

German Patent Application No. DE 10 2014 224 800 A1 describes a method for knock control, in which a knock signal of a cylinder is measured by a knock sensor and, on the basis thereof, a knock intensity is generated. In order to evaluate whether a combustion has taken place with or without knocking, the knock intensity is compared to a reference level. The reference level is calculated by way of sliding averaging of preceding knock intensities.

SUMMARY

An example method according to the present invention and the device according to the present invention may have the advantage over the related art that a redetermination of the reference level, which has been adapted to the level of the knock intensity, takes place. In particular, as a result, knock intensities which are not yet knocking but nevertheless have an increased value, may be taken into account in such a way that their effect on the reference level is lower. In this way, it may be ensured that an increase of the reference level does not take place in operating ranges which are not yet evaluated as knocking but, however, have an increased knock intensity, whereby a detection of the knocking combustions would be made difficult. In this way, the full sensitivity to knocking combustions is retained, even when increased knock intensities have occurred for a longer period of time before the knocking combustion. The knock detection is considerably improved in this way.

Further advantages and improvements are described herein. The recalculation of the reference level may take place particularly easily by way of the sliding averaging under the effect of the knock intensity and is affected by the selection of an appropriate weighting factor. In a particularly meaningful way to calculate the reference level, present knock intensities are differentiated, in this case, according to low knock intensities without knocking, increased knock intensities without knocking, and increased knock intensities with knocking. Different adjustment factors are utilized for each of these ranges. Particularly easily, the reference values are ascertained via division by the reference level or subtraction of the reference level. The knock detection thresholds may depend, in particular, on operating parameters, or may be calculated, particularly easily, on the basis of the other. Different adjustment factors may be utilized for each of the different ranges. Upon detection of knocking, operating parameters of the internal combustion engine are influenced in the direction of a non-knocking combustion, an impact on the ignition angle taking place particularly rapidly.

BRIEF DESCRIPTION OF THE DRAWINGS

Exemplary embodiments of the present invention are shown in the figures and are described in greater detail below.

DETAILED DESCRIPTION OF EXAMPLE EMBODIMENTS

Figure 1:
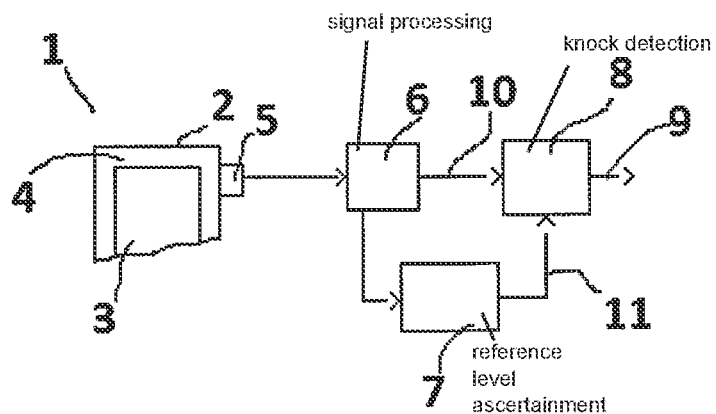
FIG. 1 shows an internal combustion engine including knock control.

FIG. 1 schematically shows an internal combustion engine 1, in which a cylinder 2 including a piston 3 contained therein forms a combustion chamber 4. A knock sensor 5, which measures a knock signal of cylinder 2, is represented on the outer side of cylinder 2. Such a knock signal is a noise signal or vibrations of cylinder 2, which result due to combustion processes in combustion chamber 4. The knock signals of knock sensor 5 are sent to a signal processing 6 which, on the basis thereof, generates a knock intensity 10 for every combustion. A knock intensity 10 for this combustion is generated for each combustion process in cylinder 2. Ascertained knock intensities 10 are then forwarded to a reference level ascertainment 7. The reference level ascertainment ascertains, on the basis of transmitted knock intensities 10, a reference level 11 which is then forwarded to knock detection 8. Knock detection 8 also receives knock intensity 10 of the present combustion from signal processing 6 and, on the basis of a comparison of knock intensity 10 with reference level 11, decides whether the combustion is to be classified as knocking or non-knocking combustion. Correspondingly, knock detection 8 outputs an appropriate signal 9 which contains the information whether the combustion was knocking or not.

Various processing blocks 6, 7, 8 may be jointly implemented in a computer as appropriate software blocks. Correspondingly, the knock signal of knock sensor 5 would then be analog/digital-converted, after an analog prefiltering having taken place, if necessary, and then processed with the aid of appropriate processing blocks designed as software in an appropriate microcomputer. One possible form of the conversion of the knock signals into knock intensities is, for example, a Fourier transform and summation of the energy contained in the particular frequency ranges. In this case, in particular, different frequency ranges may be weighted to different extents, since some frequencies particularly reliably indicate a knock event. Alternatively, the knock signals may also be rectified and integrated, which also generates a knock intensity 10 which indicates the strength of the combustion in combustion chamber 4.

In reference level ascertainment 7, the ascertainment of the reference level takes place via evaluation of a plurality of knock intensities 10 which are made available by signal processing 6. The conventional reference level ascertainment described in German Patent Application No. DE 10 2014 224 800 takes place in that a sliding averaging takes place across a plurality of knock intensities 10. For this purpose, a present knock intensity is usually multiplied by a weighting factor G<1 and this value is then added to the preceding reference level which has been multiplied by (1−G).

This form of the ascertainment of the reference level is problematic when the internal combustion engine is operated in a range in which increased knock intensities occur, without these knock intensities actually being identified as knocking combustions. Such an operation may occur when the internal combustion engine slowly enters a phase in which knocking combustions occur and the knock intensities continuously increase in the transition phase.

In such a case, due to the continuously increasing knock intensities, the reference level is drawn to a value which is relatively insensitive for the knock detection, so that the occurrence of knocking may then be identifiable only with difficulty with respect to the reference level, which has been learned in this way. According to the present invention, a reference level ascertainment is now provided, in the case of which such a learning of an insensitive reference level does not take place during an operating phase having increased knock intensities which, however, are not considered to be knocking.

In order to specifically explain the method according to the present invention, a certain method of the comparison of the knock intensity with the reference level is assumed in the following, by way of a division of knock intensity $I_{akt}$, which is measured during a present combustion, by present reference value $Ref_{akt}$. Therefore, a comparison value is formed for a present combustion $V_{akt}$ on the basis of a present intensity $I_{akt}$ and $Ref_{akt}$ by way of a simple division:

$$V_{akt} = I_{akt}/Ref_{akt}$$

Comparison value $V_{akt}$ formed in this way indicates, in principle, the percentage by which the present knock intensity exceeds the reference level. When the comparison value has the absolute value 1, the knock intensity precisely corresponds to the reference level; when $V_{akt}$ is less than 1, present knock intensity $I_{akt}$ is below reference value $Ref_{akt}$, and when the value for $V_{akt}$ is greater than 1, the present knock intensity exceeds the reference level. Various ranges for comparison value $V_{akt}$ will now be defined.

When comparison value $V_{akt}$ is below a first value which is referred to in the following as knock detection threshold KE1, the present combustion is classified as non-knocking and the normal reference level adjustment takes place with the aid of a first factor G, as is already known from DE 10 2014 224 800.

When comparison value $V_{akt}$ is greater than this first knock detection threshold KE1 but is still less than a second knock detection threshold KE2, the combustion is also evaluated as non-knocking, but the reference level is formed with the aid of a second weighting factor G2 for the present knock intensity. In particular, weighting factor G2 is selected, in this case, in such a way that the effect of the present knock intensity, which, of course, was greater than first knock detection threshold KE1, has a lesser effect on the formation of the new reference level. The effect of this knock intensity which, of course, was slightly increased, on the formation of the reference level is reduced in this way. Due to this measure, in particular, the learning of an elevated reference level during a slow change of the internal combustion engine in the direction of knocking combustion is prevented. During knock intensities which lie in this range, i.e., are greater than KE1 but less than KE2, an influencing of the internal combustion engine to take knock tendency-reducing measures still does not take place, however. Such knock tendency-preventing measures may be, for example, an impact on the ignition angle in the direction of a later ignition or a reduction of the charge of the internal combustion engine or an increased cooling of the internal combustion engine.

When the comparison value also exceeds second knock detection threshold KE2, the present combustion, at which this value has occurred, is identified as knocking combustion and measures take place in order to prevent such a knocking of the internal combustion engine already during the next following combustion. Since an impact on the ignition angle is the fastest possibility for preventing knocking, and the period of time until the next combustion is relatively short, the ignition angle is usually adjusted in the retard direction. Other measures, such as changing the air supply to the internal combustion engine, generally require multiple combustion processes in order to be effective and, therefore, are not as fast as changing the ignition angle. Moreover, the knock intensity of a knocking combustion should not be utilized for the formation of the reference level, since knocking combustions may no longer be detected with the aid of such a reference level. For the case that the comparison value therefore exceeds second knock detection threshold KE2, either this value is not utilized at all for the formation of the reference level or is replaced by a fixed value or is taken into account only to a considerably reduced extent. When the value is taken into account, it is taken into account only including a considerably lower weighting factor G3 as compared to the non-knocking combustion, in particular, in comparison to the non-knocking combustion having a comparison value below knock detection threshold KE1. This weighting factor G3 may then also be considerably reduced once again, as compared to weighting factor G2 which was utilized for a comparison value less than second knock detection threshold KE2 but greater than first knock detection threshold KE1.

First knock detection threshold KE1 and second knock detection threshold KE2 may depend on operating parameters of the internal combustion engine. In particular, these values may depend on the load and the rotational speed of the internal combustion engine, so that, for example, other values are utilized at higher loads and higher rotational speeds than at lower loads and lower rotational speeds. Adjustment factors G, which are utilized for the particular ranges, may also depend on operating parameters of the internal combustion engine, in particular, the load and the rotational speed.

It is also to be noted here that other forms of the ascertainment of comparison value $V_{akt}$ from present knock intensity $I_{akt}$ and reference value $Ref_{akt}$ are possible. For example, the comparison value may also be ascertained via subtraction:

$$V_{akt} = I_{akt} - Ref_{akt}$$

When comparison value $V_{akt}$ is negative, the intensity of present combustion $I_{akt}$ was below reference value $Ref_{akt}$. When comparison value $V_{akt}$ is positive, the intensity of the present combustion exceeded the reference value, this value then indicating the actual amount and no longer indicating the percentage difference, as is the case with the division. In this type of comparison value formation via subtraction, other thresholds KE1 and KE2 must be utilized, of course, for the ranges of non-knocking and normal adjustment, non-knocking and reduced adjustment, and for the range of knocking and reduced adjustment.

Since first knock detection threshold KE1 is always lower than second knock detection threshold KE2, these values may also be easily ascertained via conversion on the basis of the other. For example, in each case, only one value for second knock detection threshold KE2 may be stored and first knock detection threshold KE1 easily results from KE2 via multiplication by a reducing factor (i.e., less than 1). It may be easily established, for example, that KE1 is always 80% of the value of KE2. The factor by which KE2 is multiplied in order to obtain KE1 may also depend on operating parameters of the internal combustion engine, of course. Moreover, this factor by which second knock detection threshold KE2 is multiplied in order to obtain first knock detection threshold KE1 may also be utilized, for the range of the non-knocking combustion having increased knock intensity, in order to establish adjustment factor G for the formation of the reference level in this range. For this purpose, for example, in this range (KE1<comparison value<KE2), the knock intensity may be multiplied by this factor in order to form the reference level. Alternatively, first knock detection threshold KE1 may also be ascertained via subtraction from KE2, in that, for example, a fixed value or an operating parameter-dependent value is simply subtracted from KE2. It is only essential, in this case, that first knock detection threshold KE1 is less than second knock detection threshold KE2.

Figure 2:
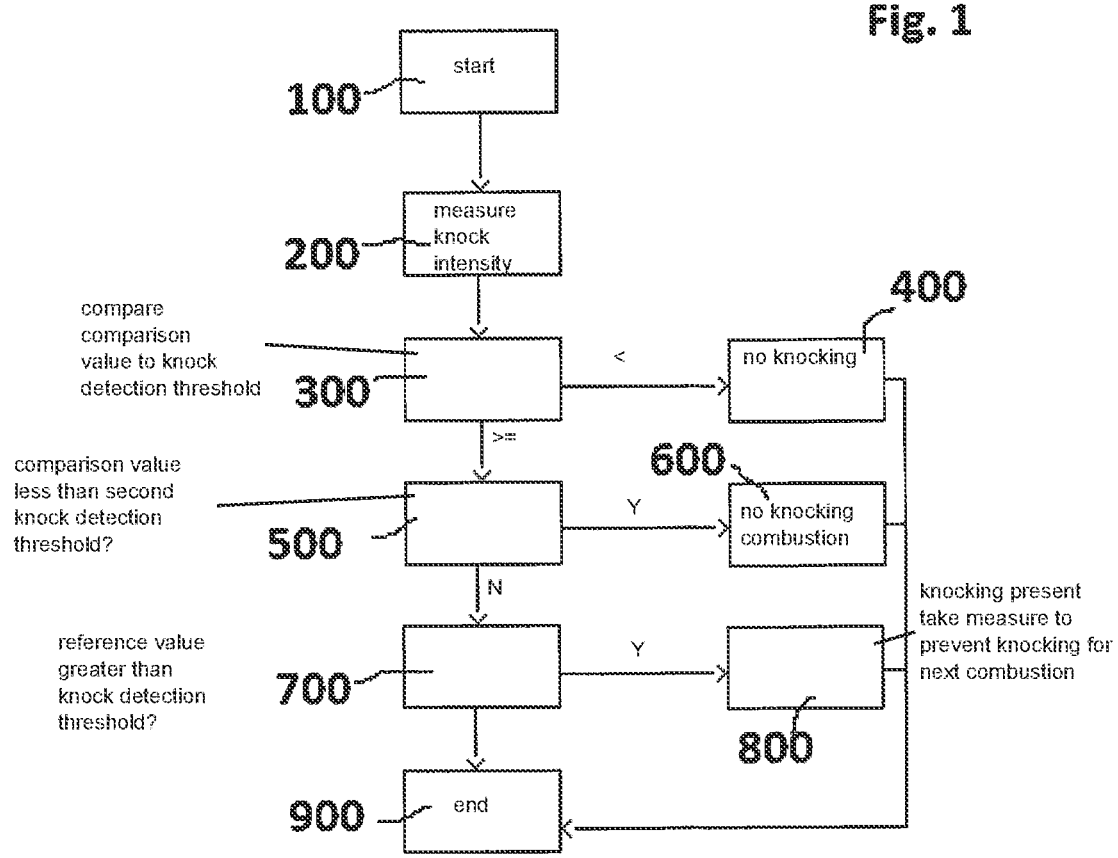
FIG. 2 shows method steps of the method according to the present invention.

In FIG. 2, method steps of the method according to the present invention are merely represented once more. After a start step 100, step 200 takes place, which is the measurement of present knock intensity $I_{akt}$ of the present combustion and the formation of present comparison value $V_{akt}$, in that measured knock intensity $I_{akt}$ is divided by present reference value $Ref_{akt}$. In subsequent step 300, the comparison of comparison value $V_{akt}$ to knock detection threshold KE1 then takes place. When the comparison value is less than knock detection threshold KE1, step 300 is followed by step 400. In step 400 it is established that no knocking combustion was present and, therefore, no change of the operating parameters of the internal combustion engine are required. Moreover, the calculation of the reference level for the next combustion takes place, the usual sliding averaging taking place while appropriately taking present knock intensity $I_{akt}$ into account. Step 400 is followed by the conclusion of the method in step 900.

When it is established in step 300 that present comparison value $V_{akt}$ is not less than first knock detection threshold KE1, step 300 is followed by step 500. In step 500, a check is carried out to determine whether the comparison value, which is greater than first knock detection threshold KE1, of course, is simultaneously less than second knock detection threshold KE2. When this is confirmed, step 500 is followed by step 600, in which it is established that no knocking combustion was present and, therefore, no influence of the operating conditions of the internal combustion engine takes place. Simultaneously, there is a slightly increased knock intensity, however, so that this knock intensity $I_{akt}$ is taken into account only to a reduced extent for the formation of the reference level for the next combustion. For this purpose, as compared to step 400, a reduced weighting factor G is utilized, which is either taken from a characteristic map as a function of operating parameters of the internal combustion engine or is calculated by way of the above-described calculations on the basis of knock detection thresholds KE2 and KE1. Step 600 is followed by step 900, in which the method is ended.

When it is not established in step 500 that the comparison value is less than second knock detection threshold KE2, step 700 follows, in which a check is carried out once again to determine whether the reference value is greater than second knock detection threshold KE2. When this is the case, step 700 is followed by step 800, in which it is established that knocking is present and measures are taken to prevent the knocking for the next combustion by changing operating parameters of the internal combustion engine. The measure is to take place so quickly in this case that no knocking takes place immediately during the next combustion, since a knocking operation of the internal combustion engine may considerably adversely affect the service life of an internal combustion engine. An influence of the ignition angle usually takes place for this purpose, since this measure may be implemented very rapidly between two combustion processes in an internal combustion engine. Moreover, a recalculation of the reference level for the subsequent combustion takes place, the intensity of the combustion recognized as knocking having only a very minor effect on the reference level. In this case, for example, the reference level may simply remain unchanged or it is only recalculated with the aid of a fixed value or a weighting factor is taken into account which is considerably reduced as compared to step 400. Moreover, this weighting factor G may also be considerably reduced as compared to method step 600. Step 800 is then followed by step 900 once again, in which the method is terminated.

What is claimed is:

1. A method for knock control of an internal combustion engine, the method comprising:
determining a reference level using knock intensities of preceding combustions;
for a present combustion, measuring, by a knock sensor, a knock signal of a cylinder of the internal combustion engine and generating, based on the measuring, a present knock intensity;
forming a present comparison value by: (i) dividing the present knock intensity by a present reference value, or (ii) subtracting the present reference value from the present knock intensity; wherein the present reference value is a current value of the reference level at the time of the present combustion;
when the present comparison value remains below a first knock detection threshold, the present combustion is classified as a non-knocking combustion, and the reference level for a next combustion is formed from: (i) the present reference value, and (ii) the present knock intensity multiplied by a first adjustment factor;
when the present comparison value exceeds the first knock detection threshold and remains below a second knock detection threshold, the present combustion is classified as a non-knocking combustion, and the reference level for the next combustion is formed from: (i) the present reference value, and (ii) the present knock intensity multiplied by a second adjustment factor; and
when the present comparison value exceeds the first knock detection threshold and exceeds the second knock detection threshold, the present combustion is classified as a knocking combustion and the reference level for the next combustion is formed from: (i) the present reference value, and (ii) the present knock intensity multiplied by a third adjustment factor.

2. The method as recited in claim 1, wherein the first knock detecting threshold and the second knock detection threshold depend on operating parameters of the internal combustion engine.

3. The method as recited in claim 1, wherein the first adjustment factor is greater than the second adjustment factor and the third adjustment factor.

4. The method as recited in claim 3, wherein the second adjustment factor is greater than the third adjustment factor.

5. The method as recited in claim 1, wherein, when knocking is detected, operating parameters of the internal combustion engine are changed to prevent knocking of the internal combustion engine.

6. A device for knock control of an internal combustion engine, comprising:

a knock sensor configured to measure, for a present combustion, a knock signal of a cylinder of the internal combustion engine and to generate, based on the knock signal, a present knock intensity;

a computer configured to determine a reference level using knock intensities of preceding combustions, and to form a present comparison value by: (i) dividing the present knock intensity by a present reference value, or (ii) subtracting the present reference value from the present knock intensity value; wherein the present reference value is a current value of the reference level at the time of the present combustion;

when the present comparison value remains below a first knock detection threshold, the computer is configured to classify the present combustion as a non-knocking combustion, and to form the reference level for a next combustion from: (i) the present reference value, and (ii) the present knock intensity multiplied by a first adjustment factor;

when present comparison value exceeds the first knock detection threshold and remains below a second knock detection threshold, the computer is configured to classify the present combustion as non-knocking combustion and to form the reference level for the next combustion from: (i) the present reference value, and (ii) the present knock intensity multiplied by a second adjustment factor;

when the present comparison value exceeds the first knock detection threshold and exceeds second knock detection threshold, the computer is configured to classify the present combustion as a knocking combustion, and to form the reference level for the next combustion from: (i) the present reference value, and (ii) the present knock intensity multiplied by a third adjustment factor.

7. The device as recited in claim 6, wherein the first adjustment factor is greater than the second adjustment factor and the third adjustment factor.

8. The device as recited in claim 7, wherein the second adjustment factor is greater than the third adjustment factor.

* * * * *